United States Patent [19]
de Nora

[11] Patent Number: 5,888,360
[45] Date of Patent: Mar. 30, 1999

[54] CELL FOR ALUMINIUM ELECTROWINNING

[75] Inventor: Vittorio de Nora, Nassau, Bahamas

[73] Assignee: Moltech Invent S.A., Luxembourg, Luxembourg

[21] Appl. No.: 961,924

[22] Filed: Oct. 31, 1997

Related U.S. Application Data

[62] Division of Ser. No. 571,629, Dec. 13, 1995, Pat. No. 5,683,559, which is a continuation of Ser. No. 302,178, Sep. 8, 1994, abandoned.

[51] Int. Cl.[6] ............................................. C25C 3/08
[52] U.S. Cl. ..................... 204/243 R; 204/245; 204/294
[58] Field of Search ...................... 204/243 R, 244–247, 204/294

[56] References Cited

U.S. PATENT DOCUMENTS

| | | |
|---|---|---|
| 2,859,138 | 11/1958 | Blanchard . |
| 2,866,724 | 12/1958 | Alexander . |
| 2,915,442 | 12/1959 | Lewis . |
| 3,016,288 | 1/1962 | Andrieux et al. . |

(List continued on next page.)

FOREIGN PATENT DOCUMENTS

| | | |
|---|---|---|
| 0126555 | 11/1984 | European Pat. Off. . |
| 0192602 | 8/1986 | European Pat. Off. . |
| 0257708 | 3/1988 | European Pat. Off. . |
| 0258510 | 3/1988 | European Pat. Off. . |
| 0367372 | 5/1990 | European Pat. Off. . |
| 0393816 | 10/1990 | European Pat. Off. . |
| 0404943 | 1/1991 | European Pat. Off. . |
| 0426485 | 5/1991 | European Pat. Off. . |
| 0431165 | 6/1991 | European Pat. Off. . |
| 0517100 | 12/1992 | European Pat. Off. . |
| 1173804 | 3/1959 | France . |
| 2144156 | 8/1974 | Germany . |
| 3802670 | 8/1989 | Germany . |
| 1177829 | 1/1970 | United Kingdom . |
| 9003956 | 4/1990 | WIPO . |
| 9007013 | 6/1990 | WIPO . |
| 9013513 | 11/1990 | WIPO . |
| 9200399 | 1/1992 | WIPO . |
| 9203597 | 3/1992 | WIPO . |
| 9209724 | 6/1992 | WIPO . |
| 9222682 | 12/1992 | WIPO . |
| 9320026 | 10/1993 | WIPO . |
| 9325731 | 12/1993 | WIPO . |
| 9607773 | 3/1996 | WIPO . |
| 9708114 | 3/1997 | WIPO . |

OTHER PUBLICATIONS

R.W. Rice et al., "Effects of Self–Propagating Synthesis Reactant Compact Character on Ignition, Propagation and Resultant Microstructure" Ceramic Engineering, 7 (1986) pp. 737–749. (No Month).

C.H. Samans, "Powder Metallurgy", American Society for Metals, Metals Handbook, 1948, pp. 47–52. (No Month).

H.C. Yi et al., "Self–propagating high–temperature (combustion) synthesis (SHS) of powder–compacted materials", 1988, pp. 1159–1168. (No Month).

J.W. McCauley et al., "Simultaneous Preparation and Self-–Sintering of Materials in the System Ti–B–C", Ceramic Engineering, 3 (1982), pp. 538–554. No Month.

*Primary Examiner*—Donald R. Valentine
*Attorney, Agent, or Firm*—Jayadeep R. Deshmukh

[57] ABSTRACT

An electrolytic cell for the electrowinning of aluminum from alumina dissolved in a halide-containing molten electrolyte, has a cathode cell bottom made of a series of carbon cathode blocks (10) connected side-by-side by glue or ramming paste, each one provided with steel or other conductive bars (11) for the delivery of current and a series of anodes (15) facing the cathode cell bottom. The tops of the carbon blocks (10) forming the cathode cell bottom are shaped in such a way as to provide in the cell bottom a series of parallel channels (25) or grooves preferably coated with an aluminum-wettable refractory coating (35) covered in use by a pool (40) of molten aluminum or a layer of molten aluminum forming a drained surface. Movement of the aluminum pool (40) is decreased, cell operation improved and cell life extended.

13 Claims, 5 Drawing Sheets

U.S. PATENT DOCUMENTS

| | | |
|---|---|---|
| 3,028,324 | 4/1962 | Ransley . |
| 3,090,094 | 5/1963 | Schwartzwalder et al. . |
| 3,097,930 | 7/1963 | Holland . |
| 3,111,396 | 11/1963 | Ball . |
| 3,156,639 | 11/1964 | Kibby . |
| 3,215,615 | 11/1965 | Ransley . |
| 3,249,460 | 5/1966 | Gerry . |
| 3,274,093 | 9/1966 | McMinn . |
| 3,314,876 | 4/1967 | Ransley . |
| 3,330,756 | 7/1967 | Ransley . |
| 3,345,440 | 10/1967 | Googin et al. . |
| 3,348,929 | 10/1967 | Valtschev et al. . |
| 3,400,061 | 9/1968 | Lewis et al. . |
| 3,404,031 | 10/1968 | Clayton et al. . |
| 3,457,158 | 7/1969 | Bullough . |
| 3,510,347 | 5/1970 | Strater . |
| 3,531,565 | 9/1970 | Webb et al. . |
| 3,558,450 | 1/1971 | Ashe, Jr. et al. . |
| 3,617,358 | 11/1971 | Dittrich . |
| 3,634,736 | 1/1972 | Loos et al. . |
| 3,661,736 | 5/1972 | Holliday . |
| 3,705,791 | 12/1972 | Bredzs . |
| 3,726,643 | 4/1973 | Merzhanov . |
| 3,778,249 | 12/1973 | Benjamin et al. . |
| 3,852,107 | 12/1974 | Lorkin et al. . |
| 3,856,650 | 12/1974 | Kugler et al. . |
| 3,859,198 | 1/1975 | Emblem et al. . |
| 3,864,164 | 2/1975 | Hinchcliffe et al. . |
| 3,893,917 | 7/1975 | Pryor et al. . |
| 3,939,028 | 2/1976 | Schiffarth et al. . |
| 3,947,363 | 3/1976 | Pryor et al. . |
| 3,962,081 | 6/1976 | Yarwood et al. . |
| 3,964,924 | 6/1976 | Kurzeja . |
| 3,969,696 | 7/1976 | Wolfe et al. . |
| 4,003,014 | 1/1977 | Branson et al. . |
| 4,024,056 | 5/1977 | Yarwood et al. . |
| 4,052,288 | 10/1977 | Sala . |
| 4,081,371 | 3/1978 | Yarwood et al. . |
| 4,093,524 | 6/1978 | Payne . |
| 4,202,691 | 5/1980 | Yurakso, Jr. . |
| 4,217,948 | 8/1980 | Merzhanov et al. . |
| 4,257,810 | 3/1981 | Narumiya . |
| 4,258,099 | 3/1981 | Narumiya . |
| 4,267,435 | 5/1981 | Best . |
| 4,292,345 | 9/1981 | Kolesnik et al. . |
| 4,308,114 | 12/1981 | Das et al. . |
| 4,308,115 | 12/1981 | Foster, Jr. et al. . |
| 4,312,718 | 1/1982 | Watanabe et al. . |
| 4,333,813 | 6/1982 | Kaplan et al. . |
| 4,333,818 | 6/1982 | Coste . |
| 4,342,637 | 8/1982 | Withers et al. . |
| 4,374,761 | 2/1983 | Ray . |
| 4,376,690 | 3/1983 | Kugler . |
| 4,384,995 | 5/1983 | Stevens . |
| 4,391,918 | 7/1983 | Brockmeyer . |
| 4,392,925 | 7/1983 | Alder et al. ............ 204/245 X |
| 4,405,433 | 9/1983 | Payne . |
| 4,418,097 | 11/1983 | Misra . |
| 4,420,294 | 12/1983 | Lichtinghagen . |
| 4,439,382 | 3/1984 | Joó et al. . |
| 4,455,211 | 6/1984 | Ray et al. . |
| 4,459,363 | 7/1984 | Holt . |
| 4,466,996 | 8/1984 | Boxall et al. . |
| 4,481,052 | 11/1984 | Buchta et al. . |
| 4,487,804 | 12/1984 | Reven . |
| 4,508,788 | 4/1985 | Cheney . |
| 4,517,037 | 5/1985 | Francis et al. . |
| 4,535,035 | 8/1985 | Smialek et al. . |
| 4,540,475 | 9/1985 | De Angelis . |
| 4,544,457 | 10/1985 | Sane et al. . |
| 4,552,630 | 11/1985 | Wheeler et al. . |
| 4,559,270 | 12/1985 | Sara . |
| 4,560,448 | 12/1985 | Sane et al. . |
| 4,567,103 | 1/1986 | Sara . |
| 4,582,553 | 4/1986 | Buchta . |
| 4,585,675 | 4/1986 | Shuford . |
| 4,592,820 | 6/1986 | McGeer . |
| 4,595,545 | 6/1986 | Sane . |
| 4,596,637 | 6/1986 | Kozarek et al. . |
| 4,600,481 | 7/1986 | Sane et al. . |
| 4,602,990 | 7/1986 | Boxall et al. . |
| 4,610,726 | 9/1986 | King . |
| 4,613,375 | 9/1986 | Förster et al. . |
| 4,614,569 | 9/1986 | Duruz et al. . |
| 4,622,111 | 11/1986 | Brown et al. . |
| 4,625,261 | 11/1986 | Weeks et al. . |
| 4,650,552 | 3/1987 | de Nora et al. . |
| 4,656,906 | 4/1987 | Mozieka et al. . |
| 4,670,201 | 6/1987 | Montgomery et al. . |
| 4,670,407 | 6/1987 | Kiehl et al. . |
| 4,678,548 | 7/1987 | Brown . |
| 4,678,760 | 7/1987 | Ray . |
| 4,680,094 | 7/1987 | Duruz . |
| 4,681,671 | 7/1987 | Duruz . |
| 4,681,819 | 7/1987 | Gnyra . |
| 4,683,037 | 7/1987 | Duruz . |
| 4,697,632 | 10/1987 | Lirones . |
| 4,699,763 | 10/1987 | Sinharoy et al. . |
| 4,710,348 | 12/1987 | Brupbacher et al. . |
| 4,711,666 | 12/1987 | Chapman et al. . |
| 4,726,995 | 2/1988 | Chiu . |
| 4,737,247 | 4/1988 | Jarrett et al. . |
| 4,738,389 | 4/1988 | Moshier et al. . |
| 4,747,873 | 5/1988 | Kamioka . |
| 4,751,048 | 6/1988 | Christodoulou et al. . |
| 4,769,074 | 9/1988 | Holcombe et al. . |
| 4,769,237 | 9/1988 | Bittle et al. . |
| 4,772,452 | 9/1988 | Brupbacher et al. . |
| 4,774,052 | 9/1988 | Nagle et al. . |
| 4,800,065 | 1/1989 | Christodoulou et al. . |
| 4,808,372 | 2/1989 | Koczak et al. . |
| 4,836,982 | 6/1989 | Brupbacher et al. . |
| 4,865,701 | 9/1989 | Beck et al. . |
| 4,877,554 | 10/1989 | Honma et al. . |
| 4,877,759 | 10/1989 | Holt et al. . |
| 4,885,073 | 12/1989 | Guangchun et al. . |
| 4,900,698 | 2/1990 | Lundsager . |
| 4,902,457 | 2/1990 | Wada et al. . |
| 4,904,424 | 2/1990 | Johnson . |
| 4,909,842 | 3/1990 | Dunmead et al. . |
| 4,915,903 | 4/1990 | Brupbacher et al. . |
| 4,915,905 | 4/1990 | Kampe et al. . |
| 4,919,771 | 4/1990 | Wilkening . |
| 4,921,531 | 5/1990 | Nagle et al. . |
| 4,921,731 | 5/1990 | Clark et al. . |
| 4,929,328 | 5/1990 | Besmann et al. . |
| 4,935,265 | 6/1990 | Pike . |
| 4,948,676 | 8/1990 | Darracq et al. . |
| 4,948,761 | 8/1990 | Hida . |
| 4,957,885 | 9/1990 | Hida . |
| 4,961,778 | 10/1990 | Pyzik et al. . |
| 4,965,044 | 10/1990 | Miyamoto et al. . |
| 4,975,191 | 12/1990 | Brockmeyer et al. . |
| 4,975,412 | 12/1990 | Okazaki et al. . |
| 4,983,423 | 1/1991 | Goldsmith . |
| 4,985,202 | 1/1991 | Moshier et al. . |
| 4,988,480 | 1/1991 | Merzhanov et al. . |
| 4,988,645 | 1/1991 | Holt et al. . |
| 4,990,295 | 2/1991 | Hida . |
| 4,996,024 | 2/1991 | Nishio et al. . |
| 4,999,144 | 3/1991 | Miyamoto et al. . |
| 5,004,524 | 4/1991 | Duruz . |

| | | | | | | |
|---|---|---|---|---|---|---|
| 5,006,290 | 4/1991 | Hida . | | 5,169,307 | 12/1992 | Frye . |
| 5,015,343 | 5/1991 | LeCamera et al. . | | 5,169,572 | 12/1992 | Matthews . |
| 5,019,225 | 5/1991 | Darracq et al. . | | 5,188,678 | 2/1993 | Sekhar et al. . |
| 5,019,454 | 5/1991 | Busse . | | 5,194,330 | 3/1993 | Vandenbulcke et al. . |
| 5,022,991 | 6/1991 | Day et al. . | | 5,203,971 | 4/1993 | de Nora et al. . |
| 5,030,600 | 7/1991 | Hida et al. . | | 5,217,583 | 6/1993 | Sekhar et al. . |
| 5,032,332 | 7/1991 | Hida et al. . | | 5,286,353 | 2/1994 | Wilkening ............... 204/243 R X |
| 5,043,047 | 8/1991 | Stedman et al. ............... 204/243 R | | 5,310,476 | 5/1994 | Sekhar et al. . |
| 5,069,764 | 12/1991 | Watanabe et al. . | | 5,316,718 | 5/1994 | Sekhar . |
| 5,071,533 | 12/1991 | de Nora et al. . | | 5,320,717 | 6/1994 | Sekhar . |
| 5,071,797 | 12/1991 | Hida . | | 5,330,631 | 7/1994 | Juric et al. ..................... 204/243 R |
| 5,077,246 | 12/1991 | Weaver et al. . | | 5,340,014 | 8/1994 | Sekhar et al. . |
| 5,110,427 | 5/1992 | Meyer . | | 5,340,448 | 8/1994 | Sekhar et al. . |
| 5,110,688 | 5/1992 | Sehkar et al. . | | 5,342,491 | 8/1994 | Sekhar . |
| 5,116,691 | 5/1992 | Darolia et al. . | | 5,362,366 | 11/1994 | de Nora et al. . |
| 5,137,749 | 8/1992 | Yamazaki et al. . | | 5,364,442 | 11/1994 | Sekhar . |
| 5,143,668 | 9/1992 | Hida . | | 5,364,513 | 11/1994 | Sekhar et al. . |
| 5,145,619 | 9/1992 | Abramovici . | | 5,368,702 | 11/1994 | de Nora . |
| 5,149,677 | 9/1992 | Merzhanov et al. . | | 5,472,578 | 12/1995 | de Nora . |
| 5,154,785 | 10/1992 | Tabata et al. . | | 5,510,008 | 4/1996 | Sekhar et al. . |
| 5,158,655 | 10/1992 | Townsend . | | 5,534,119 | 7/1996 | Sekhar . |
| 5,164,233 | 11/1992 | Sonuparlak et al. . | | | | |

CELL FOR ALUMINIUM ELECTROWINNING

This is a divisional of application Ser. No. 08/571,629, filed Dec. 13, 1995, now U.S. Pat. No. 5,683,559 which is a file wrapper continuation of application Ser. No. 08/302,178, filed on Sep. 8, 1994 now abandoned.

FIELD OF THE INVENTION

The present invention concerns a new and improved cell for the electrowinning of aluminium by the electrolysis of alumina dissolved in a halide-based molten electrolyte such as cryolite.

BACKGROUND OF THE INVENTION

The technology for the production of aluminium by the electrolysis of alumina, dissolved in molten cryolite containing salts, at temperatures around 950° C. is more than one hundred years old.

This process, conceived almost simultaneously by Hall and Heroult, has not evolved as much as other electrochemical processes, despite the tremendous growth in the total production of aluminium that in fifty years has increased almost one hundred fold. The process and the cell design have not undergone any great change or improvement and carbonaceous materials are still used as electrodes and cell linings.

The electrolytic cell trough is typically made of a steel shell provided with an insulating lining of refractory material covered by anthracite-based or graphite carbon blocks at the wall and at the cell floor bottom which acts as cathode and to which the negative pole of a direct current source is connected by means of steel conductor bars embedded in the carbon blocks.

The anodes are still made of carbonaceous material and must be replaced every few weeks. The operating temperature is still approximately 950° C. in order to have a sufficiently high rate of dissolution of alumina which decreases at lower temperatures and to have a higher conductivity of the electrolyte.

The carbonaceous materials used in Hall-Heroult cells as cell lining deteriorate under the existing adverse operating conditions and limit the cell life.

The anodes have a very short life because during electrolysis the oxygen which should evolve on the anode surface combines with the carbon to form $CO_2$ and small amounts of CO. The actual consumption of the anode is approximately 450 kg/ton of aluminium produced which is more than ⅓ higher than the theoretical amount.

The carbon lining of the cathode bottom has a useful life of a few years after which the operation of the entire cell must be stopped and the cell relined at great cost. Despite an aluminium pool having a thickness of 15 to 20 cm maintained over the cathode, the deterioration of the cathode carbon blocks cannot be avoided because of penetration of sodium into the carbon which by chemical reaction and intercalation causes swelling, deformation and disintegration of the cathode carbon blocks, as well as penetration of cryolite and liquid aluminium.

The carbon blocks of the cell side wall do not resist oxidation and attack by cryolite and a layer of solidified cryolite has to be maintained on the cell side walls to protect them. In addition, when cells are rebuilt, there are problems of disposal of the carbon cathodes which contain toxic compounds including cyanides.

Another major drawback, however, is due to the fact that irregular electromagnetic forces create waves in the molten aluminium pool and the anode-cathode distance (ACD), also called interelectrode gap (IEG), must be kept at a safe minimum value of approximately 50 mm to avoid short circuiting between the aluminium cathode and the anode or reoxidation of the metal by contact with the $CO_2$ gas formed at the anode surface.

The high electrical resistivity of the electrolyte, which is about 0.4 ohm. cm., causes a voltage drop which alone represents more than 40% of the total voltage drop with a resulting energy efficiency which reaches only 25% in the most modern cells. The high cost of energy together with the low efficiency, has become an even bigger item in the total manufacturing cost of aluminium since the oil crisis, and has decreased the rate of growth of this important metal.

In the second largest electrochemical industry following aluminium, namely the caustic and chlorine industry, the invention of the dimensionally stable anodes (DSA®) based on noble metal activated titanium metal, which were developed around 1970, permitted a revolutionary progress in the chlorine cell technology resulting in a substantial increase in cell energy efficiency, in cell life and in chlorine-caustic purity. The substitution of graphite anodes with DSA® increased drastically the life of the anodes and reduced substantially the cost of operating the cells. Rapid growth of the chlorine caustic industry was retarded only by ecological concerns.

In the case of aluminium production, pollution is not due to the aluminium produced, but to the materials and the manufacturing processes used and to the cell design and operation.

However, progress has been reported in the operation of modern aluminium plants which utilize cells where the gases emanating from the cells are in large part collected and adequately scrubbed and where the emission of highly polluting gases during the manufacture of the carbon anodes and cathodes is carefully controlled.

While progress has been reported in the fabrication of carbon cathodes by the application of coatings or layers using new aluminium wettable materials which are also a barrier to sodium penetration during electrolysis, no progress has been achieved in design of cathodes for aluminium production cells with a view to reducing the interelectrode gap and the rate of wear of its surface.

U.S. Pat. No. 4,560,488 to Sane et al discloses a recent development in molten salt electrolysis cells concerning making materials wettable by molten aluminium. However, the carbon or graphite anodes and cathodes are of conventional design with no suggestion leading to the present invention.

U.S. Pat. No. 4,681,671 to Duruz illustrates another improvement in molten salt electrolysis wherein operation at lower than usual temperatures is carried out utilizing permanent anodes, e.g. metal, alloy, ceramic or a metal-ceramic composite as disclosed in European Patent Application No. 0030834 and U.S. Pat. No. 4,397,729. Again, while improved operation is achieved at lower temperatures, there is no suggestion of the subject matter of the present invention.

PCT Application WO 89/06289 to La Camera et al deals with an improved molten electrolysis wherein attention is directed to an electrode having increased surface area. However, again, there is no disclosure leading one to the present invention.

The following references disclose several other attempts to improve cell operation.

European Patent Application No. 0308015 to de Nora discloses a novel current collector;

European Patent Application No. 0308013 to de Nora deals with a novel composite cell bottom; and European Patent Application No. 0132031 to Dewing provides a novel cell lining.

U.S. Pat. No. 5,203,971 discloses an aluminium electrowinning cell having a partly refractory and partly carbon based cell lining. The carbon-based part of the cell bottom may be recessed in respect to the refractory part.

While the foregoing references indicate continued efforts to improve the operation of molten cell electrolysis operations, none deal with or suggest the present invention.

SUMMARY OF THE INVENTION

This invention aims to overcome problems inherent in the conventional design of cells used in the electrowinning of aluminium via electrolysis of alumina dissolved in molten halides in particular cryolite.

The present invention permits more efficient cell operation by modifying the design of the cathode blocks on the cell bottom. Such a modified design may then be utilized in any conventional cell and even in drained cell configurations.

The invention concerns an electrolytic cell for the electrowinning of aluminium from alumina dissolved in a halide-containing molten electrolyte, having a cathode cell bottom made of a series of carbon cathode blocks connected side-by-side for example with ramming paste as in conventional cells or, preferably, by glue, where each cathode block being provided with steel or other conductive bars for the delivery of current, and there being a series of anodes facing the cathode cell bottom.

According to the invention, the tops of the carbon blocks forming the cathode cell bottom are provided with a series of parallel channels or grooves covered in use by a pool or layer of molten aluminium, so as to greatly decrease movement of the aluminium pool and substantially improve cell operation and extend cell life.

The surfaces of the carbon blocks making up the cathode cell bottom are most preferably coated with a layer of aluminium-wettable refractory material, advantageously a particulate refractory hard metal boride applied from a slurry containing colloid, for example as disclosed in PCT/US93/05142.

The surfaces of the carbon blocks making up the cathode cell bottom may be covered by a layer of molten aluminium forming a drained cathode surface; the channels or grooves forming a canal serving to guide the flow of aluminium. In this drained configuration, the channels or grooves are partly filled with molten aluminium so that the electrolysis takes place between the aluminium-wetted cathode and the facing anode surface.

Alternatively, the surfaces of the carbon blocks making up the cathode cell bottom are covered by a pool of molten aluminium, the channels or grooves serving to restrain motion of the aluminium making up this pool. In this case, the aluminium pool completely covers the carbon blocks so that the electrolysis takes place between the surface of the aluminium pool and the facing anode surface. Due to the fact that the pool is segmented into sections by the channels, the magnetohydrodynamic forces are decreased significantly and movement of aluminium in the pool is significantly reduced. The depth of the aluminium pool can thus be reduced because of the resulting reduction in turbulence.

Moreover, reduction of the turbulence in the aluminium pool is important because this is the origin for the formation of aluminium particles in the electrolyte, which particles are oxidized by $CO_2$ with the formation of alumina.

In either case, for the drained configuration or when there is a pool of aluminium, the inter-electrode distance is reduced with a concomitant reduction of cell voltage and an increase in energy efficiency.

An advantage obtained with the channeled cell bottom is that its life is extended in comparison with other electrolytic aluminium production cells. Moreover, the channeled cathode improves the uniformity of the current distribution and increases the current efficiency.

Advantageously, there may be at least one cross channel or groove which intersects with the parallel channels or grooves, and serves to drain the aluminium.

At least some of the channels or grooves can be formed by bevels or cut-outs along the edges of the carbon blocks. In particular, a channel can be defined between two beveled edges of adjacent blocks.

In most embodiments, the width of the channels or grooves is at least as great as their depth. The channels or grooves have a rectangular, trapezoidal, V-shaped, curved or an asymmetric cross-section designed to permit the evacuation and collection of aluminium when the cell operates in a drained cell configuration, or designed to act as a barrier to aluminium movement to reduce or eliminate turbulent aluminium pool movement in a pool configuration.

When the surface of the carbon cathode cell bottom is sloping, cross channels or grooves may run down the sloping cathode bottom surface to facilitate drainage of the aluminium in a drained configuration. For example, the carbon cathode cell bottom comprises at least two sloping parts there being at the intersection of the two sloping parts a main collecting channel or an aluminium reservoir for collection of the drained aluminium.

Preferably, the surfaces of the carbon blocks making up the cathode cell bottom are treated to reduce sodium penetration, for example as described in PCT/IB94/00033 or in PCT/US93/11380, or are coated with a layer which reduces sodium penetration, for example a refractory hard metal boride applied from a slurry containing colloid as disclosed in PCT/US93/05142.

In general, the carbon cathode blocks are made resistant to chemical attack and to mechanical attack. The surfaces of the carbon blocks making up the cathode cell bottom can also be coated with a layer which prior to use or in use becomes harder than the carbon cathode block and thereby protects the surface against abrasive wear by limited movement of the molten aluminium. Moreover, the hardened cathode surface remains dimensionally stable whereas a facing carbon anode may erode and conform to the shape of the cathode. This surface-hardening effect can be achieved with the aforementioned refractory boride or other aluminium wettable refractory layers which provide an essentially dimensionally stable surface.

In this way, the cathode cell bottom can remain dimensionally stable during electrolysis, and because of this, it is both possible and advantageous to provide channels in the tops of the carbon cathode blocks because these channeled blocks will remain dimensionally stable during cell operation.

The cell incorporating the channeled cell bottom can employ conventional carbon anodes which wear in the normal way for the pool configuration but whose shape adapts to the channeled cathode, in the drained configuration. Specially-shaped carbon anodes designed to cooperate with the channeled cathode design, and in particular, to facilitate gas release at the anode while assisting drainage of molten aluminium at the cathode can also be used. Dimensionally stable anodes can also be employed.

One method of fabricating an electrolytic cell according to the invention comprises providing channels in the carbon cathode blocks before or after assembling the blocks to form the channeled cathode cell bottom. The channels are preferably machined in the carbon cathode blocks, for example using a milling cutter. For some shapes, especially with bevels, it may, however, be convenient to provide the channels by extrusion. If the blocks include bevels or cut-outs along their edges, when the adjacent blocks are brought together, the bevels or cut-outs between the assembled adjacent blocks form channels.

Machining operations such as milling/cutting in particular are simple to execute to provide a series of parallel channels or grooves of any desired shape in the carbon blocks.

When the blocks are assembled side-by-side, gaps can be left between the adjacent blocks, which gaps are filled with an anthracite-based or other usual ramming paste. Preferably, however, the blocks will be assembled using a glue, as is known for bonding together carbon cathode blocks with no or only a very small gap, such as a resin-based glue, or an inorganic glue as disclosed in PCT/IB94/00034. Either way, the assembled blocks form a continuous carbon cell bottom in the same manner as in conventional cells, apart from the fact that the surface of the cell bottom is channeled.

Before or after assembly, the carbon blocks may be treated to make them resistant to chemical and mechanical attack. Before start up of the cell for producing aluminium, the channeled cell bottom is preferably treated to harden the surface of the cathode blocks and render the surface wettable by molten aluminium, whereby in use the carbon cathode blocks remain dimensionally stable and are wetted by molten aluminium.

DESCRIPTION OF DRAWINGS

Reference is now made to the drawings wherein.

DETAILED DESCRIPTION OF THE INVENTION

Figure 1:
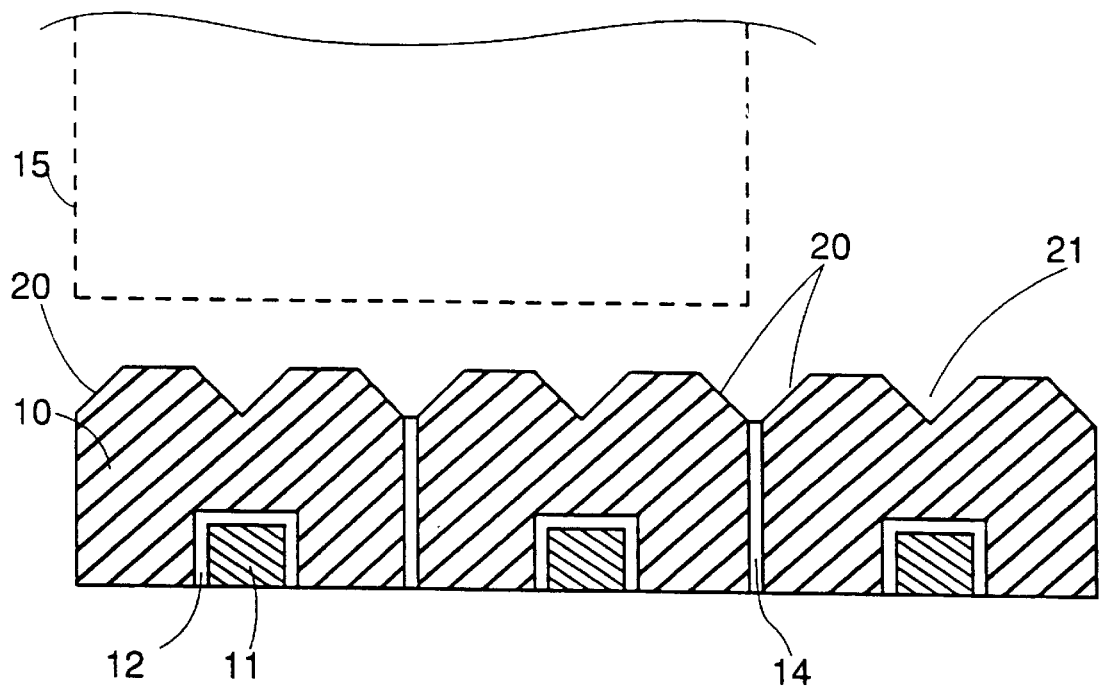
FIG. 1 schematically shows part of a cell bottom formed of three cathode blocks provided with parallel channels in accordance with the invention.

FIG. 1 schematically shows part of a cell bottom formed of an assembly of channeled cathode blocks 10 according to the invention, three such blocks being shown. The blocks 10 are generally rectangular and made of carbon in the form of anthracite or graphite of the normal grade used for aluminium production cathodes. In their lower face, the blocks 10 have a recess receiving a steel conductor bar 11 which is connected in the blocks by cast iron 12. These steel conductor bars 11 extend externally to a negative bus bar of the cell.

The side edges 20 of the blocks 10 are beveled and, in the middle of the blocks' upper surfaces, generally V-shaped grooves 21 are machined. When two blocks 10 are brought together, the adjacent beveled edges 20 form also a V-shaped groove or channel similar in shape and size, and parallel to, the grooves 21.

The adjacent blocks 10 are joined sideways by ramming paste 14, for example an anthracite-based paste to form a continuous carbon cell bottom. Usually, each block 10 extends over the entire width of the cell. If this is not so, adjacent blocks 10 in the longitudinal direction, i.e. along the direction of the conductor bars 11, may also be joined by ramming paste. Instead of using ramming paste, the blocks can advantageously be bonded by a resin-based glue, in which case the gap between the adjacent blocks would be much smaller.

An anode 15 is diagramatically indicated in a dashed line. In use, the cell bottom formed by the blocks 10 with the V-shaped grooves or channels 20, 21 is covered by a shallow pool of molten aluminium 40 (see FIG. 3), or just the grooves or channels 20, 21 are partly filled with molten aluminium, as will be described in detail later.

Figure 2:
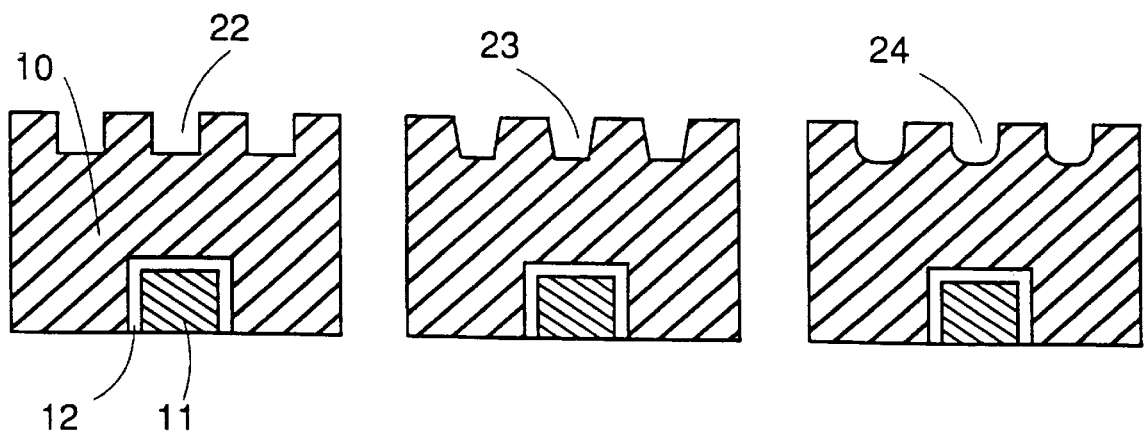
FIG. 2 schematically shows three different cathode blocks of cell bottoms in accordance with the invention provided with parallel channels of different shapes.

FIG. 2 shows three similar channeled carbon blocks 10 but with grooves or channels of different shapes, which blocks can be assembled into a cell bottom using glue or ramming paste. A first block has a parallel series of generally rectangular grooves 22 which are slightly wider than deep. Usually, the width of the grooves 22 is at least as great as their depth. The second block has generally trapezoidal grooves 23, and the third block has U-shaped grooves 24 of rounded cross-section, these shapes being given by way of example among many possible shapes.

All of the described bevels 20 and grooves 21, 22, 23, 24 can easily be machined in the blocks 10, for instance using a milling cutter. Alternatively, it is possible to provide grooves or bevels or other forms of channel by other methods, for example by extrusion.

Figure 3:
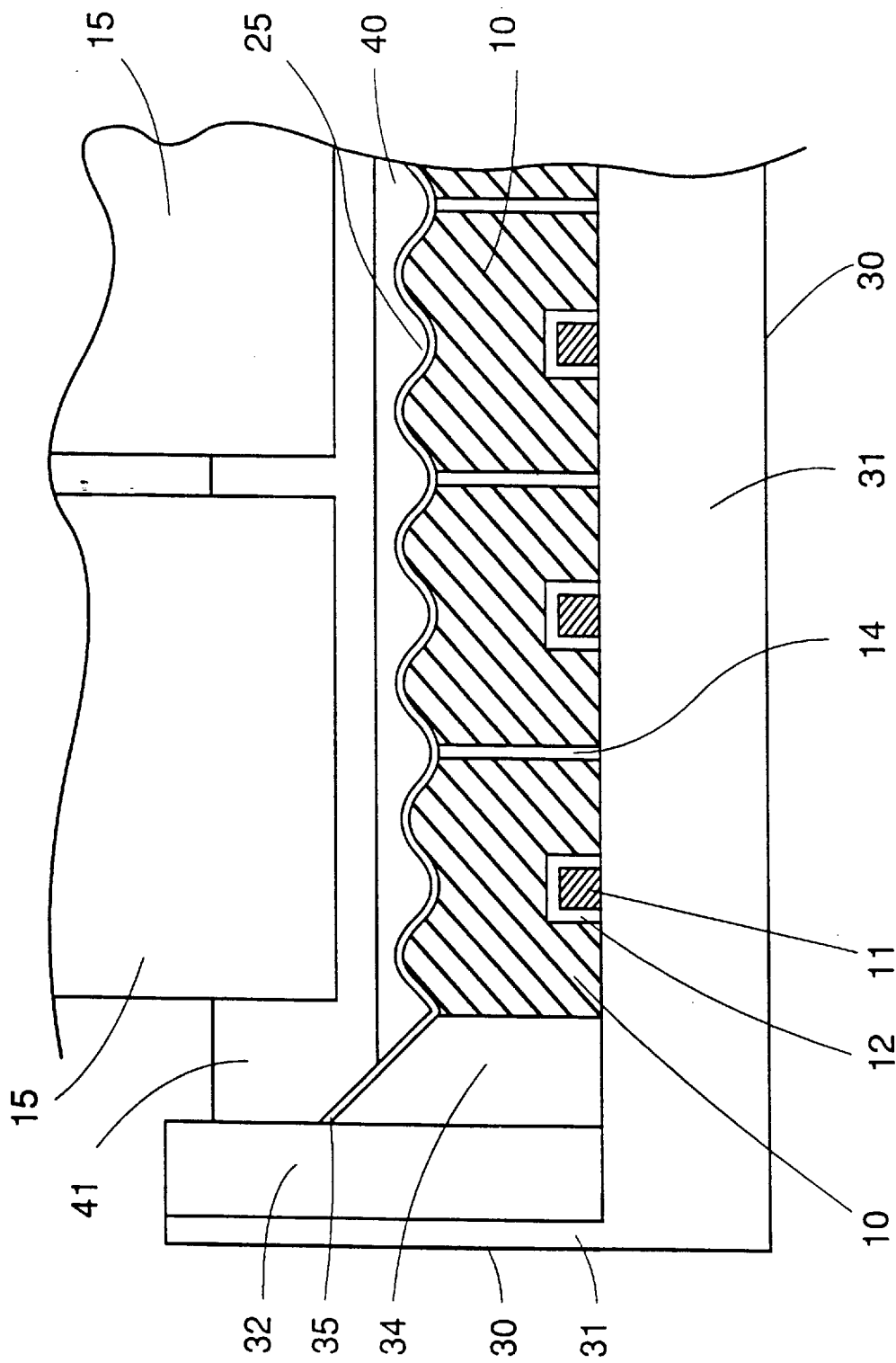
FIG. 3 is a schematic sectional view though an electrolytic cell according to the invention, incorporating channeled cathode blocks and carbon anodes.

FIG. 3 schematically shows an aluminium production cell incorporating a carbon cell bottom formed of channeled carbon blocks 10 similar to those described above. The diagramatically-shown cell structure comprises a steel shell 30 of known type containing refractory material 31 over its bottom and extending up its sides. The blocks 10, connected together by ramming paste 14 (or alternatively glued), are supported on this refractory material 31, with the sidemost blocks 10 connected by ramming paste 34 to an insert 32 of carbon or a refractory carbide such as silicon carbide. As previously, the bottoms of blocks 10 have recesses receiving steel conductor bars 11 connected in the blocks by cast iron 12, which conductor bars 11 extend externally to a negative bus bar of the cell.

The top surfaces of the blocks 10 have a series of parallel channels in the form of a wavy profile 25, though this could be any one of the other shapes shown in FIGS. 1 and 2, or other channeled shapes. This channeled profile 25 forms the top surface of the carbon cell bottom which is advantageously covered with a coating 35 of aluminium-wettable refractory material on which, as shown, there is a pool 40 of molten aluminium below a halide-based molten electrolyte 41 such as molten cryolite containing dissolved alumina.

Several anodes 15, conventionally blocks of prebaked carbon, are suspended in the cell by the usual mechanisms (not shown) enabling their height to be adjusted. Oxygen evolving non-carbon anodes may be suspended in the cell instead of the carbon anodes 15 but do not need to be vertically adjustable because they are non-consumable. The anodes 15 dip in the molten electrolyte 41 facing the channeled cathode surface 25 (the anode-cathode gap is not shown to scale). In operation, the cryolite-based electrolyte 41 is usually at a temperature of about 950° C., but the invention applies also to components used in cells with electrolytes well below 900° C., and as low as 700° C.

The surface of the channeled profile 25 of the carbon cathode blocks 10 can be made dimensionally stable by applying a coating 35 of an aluminium-wettable refractory hard metal (RHM) having little or no solubility in aluminium and having good resistance to attack by molten cryolite. Note that the coating 35 also covers the ramming paste 14 and 34. Useful RHM include borides of titanium, zirconium, tantalum, chromium, nickel, cobalt, iron, niobium and/or vanadium. Useful cathode materials are carbonaceous materials such as anthracite or graphite.

It is preferred that the channeled profile 25 of the cathode of the present invention have a coating 35 of particulate refractory hard metal boride in a colloid applied from a slurry of the particulate refractory hard metal boride in a colloid carrier, wherein the colloid comprises at least one of colloidal alumina, silica, yttria, ceria, thoria, zirconia, magnesia, lithia, monoaluminium phosphate or cerium acetate. The colloidal carrier has been found to considerably improve the properties of the coating produced by non-reactive sintering.

PCT/US93/05142 (the contents whereof are incorporated herein by way of reference) provides a method of applying refractory hard metal boride to a carbon containing component of a cell for the production of aluminium, in particular by the electrolysis of alumina dissolved in a cryolite-based molten electrolyte, this method comprising applying to the surface of the component a slurry of particulate preformed refractory boride in a colloidal carrier as specified above, followed by drying, and by heat treatment before or after the component is installed in the aluminium production cell.

The method of application of the slurry to the channeled cathodes of the present invention involves painting (by brush or roller), dipping, spraying, or pouring the slurry onto the channeled cathode and allowing to dry before another layer is added. The coating 35 does not need to be entirely dry before the application of the next layer. It is preferred to heat the coating 35 with a suitable source so as to completely dry it and improve densification of the coating. Heating and drying take place preferably in non-oxidizing atmospheres at about 80°–200° C., usually for half an hour to several hours.

The channeled profile 25 of the cathode may be treated by sand blasting or pickled with acids or fluxes such as cryolite or other combinations of fluorides and chlorides prior to the application of the coating. Similarly the channeled cathode surface may be cleaned with an organic solvent such as acetone to remove oily products and other debris prior to the application of the coating. These treatments will enhance the bonding of the coatings to the channeled carbon cathode.

After coating the channeled cathode by dipping, painting or spraying the slurry or combinations of such techniques in single or multi-layer coatings and drying, a final coat of the colloid alone may be applied lightly prior to use.

Before or after application of the coating 35 and before use, the channeled cathode can be painted, sprayed, dipped or infiltrated with reagents and precursors, gels and/or colloids. For instance, before applying the slurry of particulate refractory boride in the colloidal carrier the channeled cathode can be impregnated with e.g. a compound of lithium to improve the resistance to penetration by sodium, as described in PCT/IB94/00033 the contents of which are incorporated herein by way of reference.

To assist rapid wetting of the channeled cathode by molten aluminium, the refractory coating 35 on the channeled cathode may be exposed to molten aluminium in the presence of a flux assisting penetration of aluminium into the refractory material, the flux for example comprising a fluoride, a chloride or a borate, of at least one of lithium and sodium, or mixtures thereof. Such treatment favors aluminization of the refractory coating by the penetration therein of aluminium.

In operation of the cell illustrated in FIG. 3, as shown, the coating 35 on the channeled profile 25 of the carbon blocks 10 making up the cathode cell bottom is covered by a pool of molten aluminium 40. The channels in the surface serve to restrain motion of the aluminium making up the pool 40 mainly in the transverse direction of the cell. The aluminium pool 40 covers completely the carbon blocks 10 so that the electrolysis takes place between the surface of the aluminium pool 40 and the facing surface of anode 15. An advantage is that the depth of the aluminium pool 40 can be reduced because of the reduction in turbulence.

Alternatively, the channeled surface 25 of the carbon blocks 10 making up the cathode cell bottom, coated with a refractory aluminium-wettable coating 35, may be covered by a thin layer of molten aluminium forming a drained cathode surface, the channels serving to guide the flow of aluminium. In this drained configuration, the channels are partly filled with molten aluminium so that the electrolysis takes place between the aluminium-wetted cathode surface 25 and the facing surface of anode 15 which will tend to wear in such a way as to conform to the surface 25. A cell with such a drained configuration will be described below in connection with FIG. 6.

Figure 4:
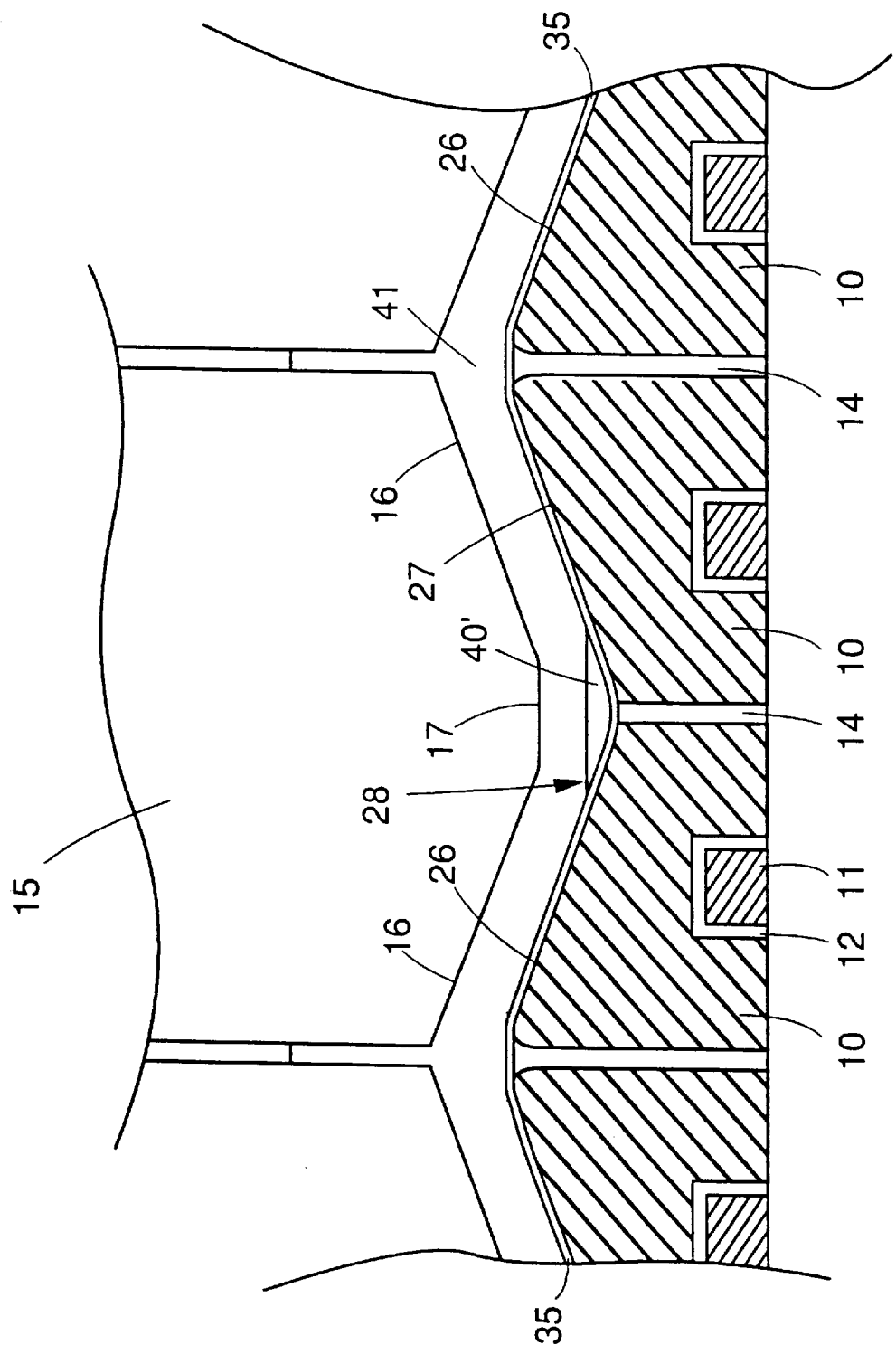
FIG. 4 is a schematic sectional view through part of another electrolytic cell according to the invention, also incorporating channeled cathode blocks and carbon anodes.

FIG. 4, where the same reference numerals are used to designate the same elements, shows part of another aluminium production cell whose cell bottom is made up of a series of channeled carbon blocks 10 joined by ramming paste 14. Here, the channels are formed by juxtaposing blocks 10 having inclined surfaces 26 or 27 arranged alternately facing one another so as to form V-shaped channels 28 between adjacent blocks, these channels 28 receiving a stream or canal 40' of molten aluminium in their bottom part. Above the V-shaped channel 28 and aluminium canal 40' are carbon anodes 15 with corresponding V-shaped active faces 16 terminating with a lower flattened part 17 opposite the aluminium canal 40'. This flattened part 17 can be formed in use.

The cell of FIG. 4 operates as a drained cathode cell, wherein the aluminium produced on the inclined cathode surfaces 26 and 27 coated with the aluminium-wettable refractory coating 35 flows down into the channel 28 where it is collected in the aluminium canal 40'. The channels 28 are inclined in the longitudinal direction of the cell in order to permanently drain the product aluminium, at a rate to keep the level of aluminium canal 40' stable.

In this drained configuration, the channels 28 are thus partly filled with molten aluminium so that the electrolysis takes place between the aluminium-wetted cathode surfaces 26, 27 and the facing surfaces 16 of anode 15, as well as between the aluminium canal 40' and the facing flattened part 17 of the anode 15 which will wear in such a way as to conform to the opposing surfaces (26, 27 and the flat top of canal 40'). Moreover, the inclination of anode surfaces 16 assists in release of the anodically-formed gases. Alternatively, it is possible to operate in a drained configuration without an aluminium canal 40', or with a narrow and shallow canal of aluminium.

Figure 5:
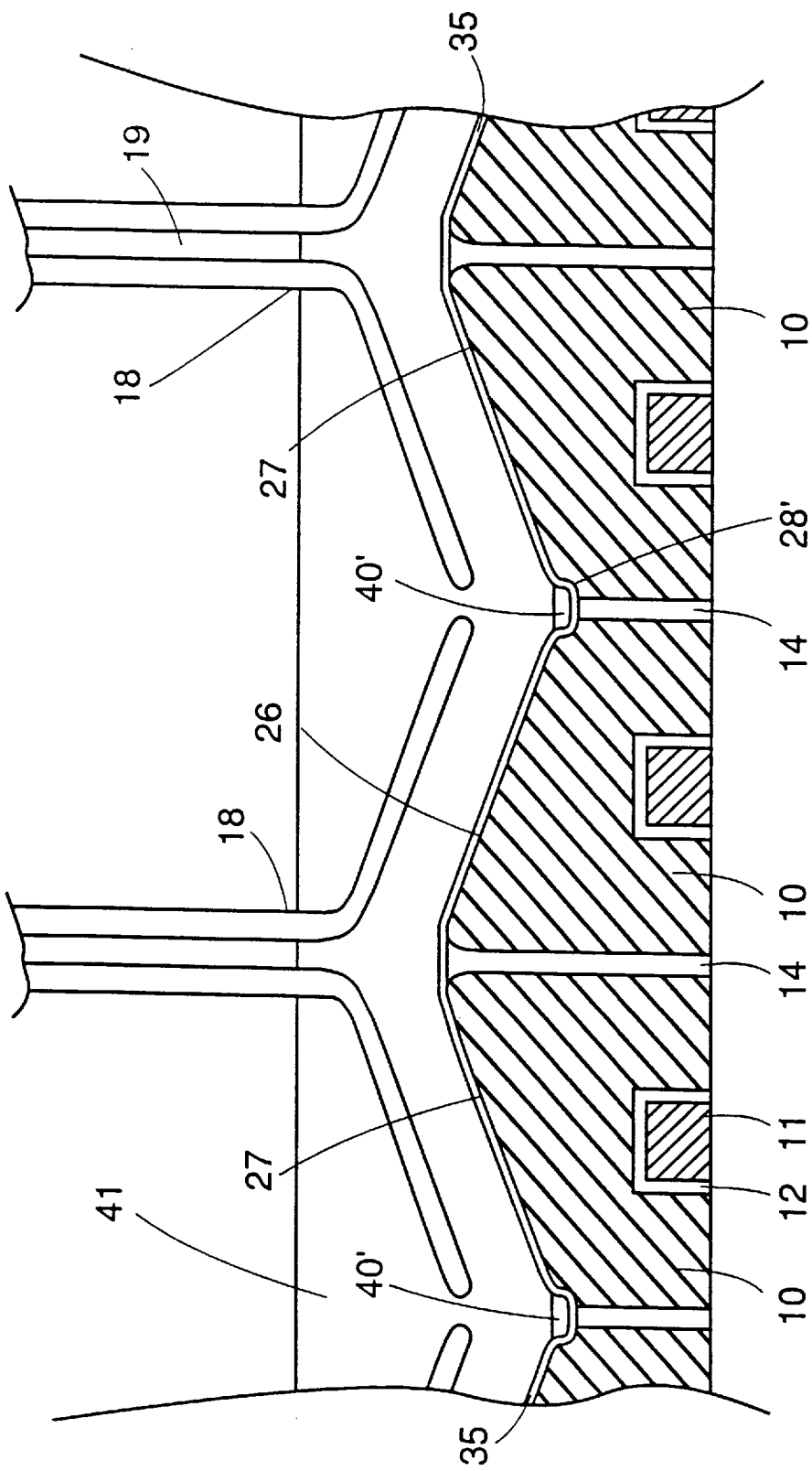
FIG. 5 is a similar view of another electrolytic cell according to the invention, incorporating channeled cathode blocks and dimensionally stable anodes.

FIG. 5 shows a cell of similar design, where the same elements are designated by the same references, but which includes dimensionally stable anodes 18 in a "roof" configuration straddling the tops of the adjacent carbon cathode blocks 10 which also have alternately arranged inclined surfaces 26, 27 coated with an aluminium-wettable refractory coating 35.

The anode plates 18 are made of or coated with any suitable non-consumable or substantially non-consumable, electronically-conductive material resistant to the electrolyte and to the anode product of electrolysis, which is normally oxygen. For example, the plates may have a metal, alloy or cermet substrate which is protected in use by a cerium-oxyfluoride-based protective coating produced and/or maintained by maintaining a concentration of cerium in the electrolyte, as described in U.S. Pat. No. 4,614,569.

The anodes 18 preferably are substantially non-consumable refractory materials resistant to the oxygen produced and the other gases, vapors and fumes present in the cell, and resistant to chemical attack by the electrolyte.

The cell of FIG. 5 also operates as a drained cathode cell, wherein the aluminium produced on the inclined cathode surfaces 26 and 27 coated with an aluminium-wettable refractory coating 35 flows down to the bottom of these inclined surfaces where it is collected as an aluminium canal 40' in a groove 28' which is generally U-shaped in cross-section. As before, the cathode surfaces 26, 27 are inclined in the longitudinal direction of the cell in order to permanently drain the product aluminium, at a rate to keep the level of the aluminium canal 40' stable. In this drained configuration, the grooves 28' are thus filled with the molten aluminium forming canal 40'. Electrolysis takes place between the aluminium-wetted cathode surfaces 26, 27 and the facing surfaces of the dimensionally-stable anodes 18. The inclination of anodes 18 assists in release of the anodically-formed gases through a central opening 19 and this can be further assisted if needed by providing ridges on the anodes 18 or making the anodes foraminate.

Figure 6:
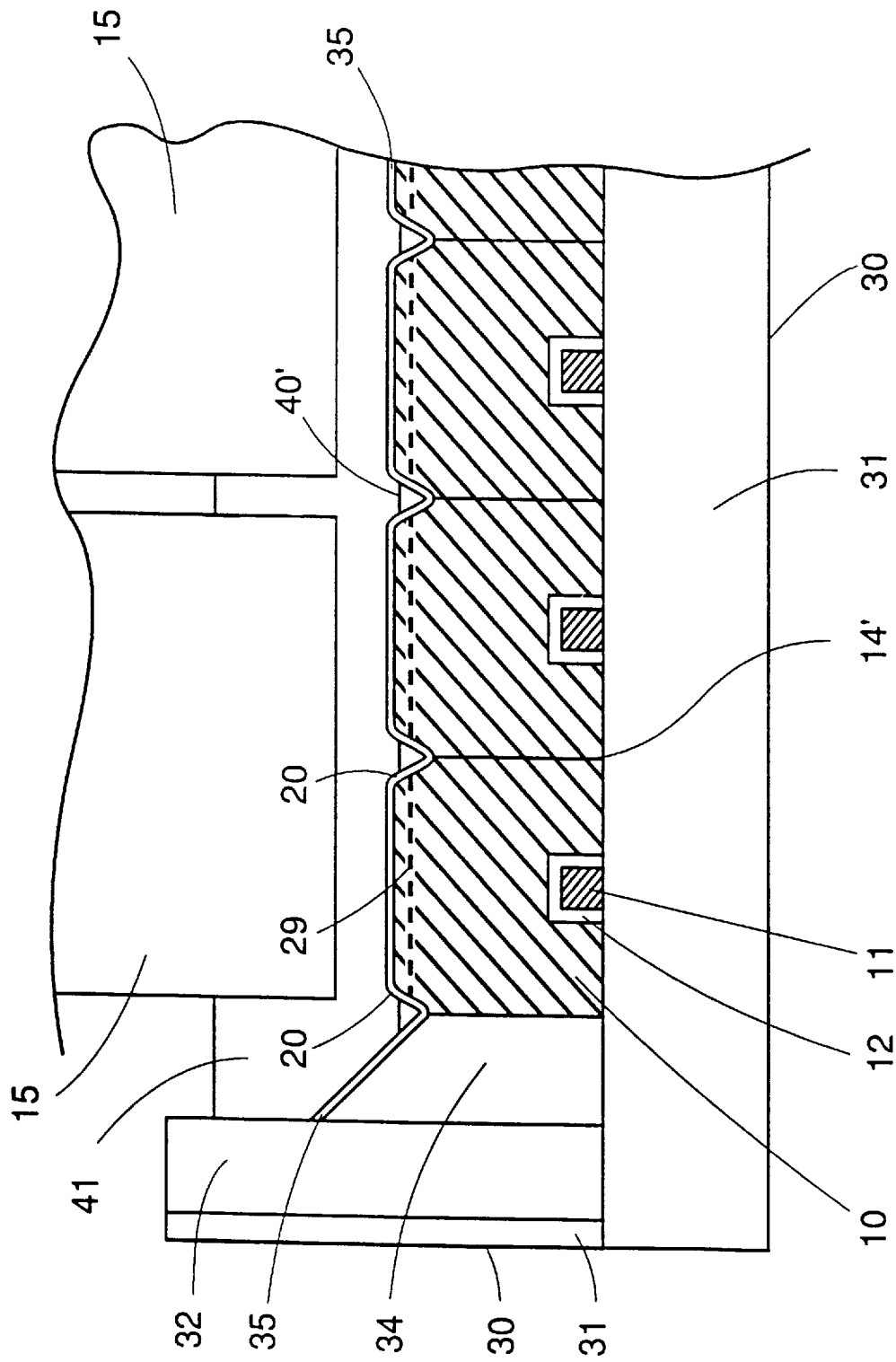
FIG. 6 is a view similar to FIG. 3 of another electrolytic cell according to the invention.

FIG. 6 shows part of another cell according to the invention similar to the cell shown in FIG. 2. Instead of having a wavy channeled surface, the blocks 10 have bevelled upper side edges 20 and may be bevelled also along their top end edges, as indicated in dotted lined at 29. The bevelled side edges 20 of the adjacent blocks form V or U-shaped channels running along the blocks 10, there being a similar V or U-shaped channel formed between the bevelled edge of the sidemost block 10 to and the adjacent mass of ramming paste 34.

In FIG. 6, the adjacent blocks 10 are shown as being bonded together by a glue 14', so there is essentially no gap between them. As shown, the aluminium-wettable refractory coating 35 covers the entire upper surfaces of blocks 10 with bevels 20 and 29, the glued joints 14', and also extends over the adjacent mass of ramming paste 34.

The purpose of the cross-bevels 29 in the top end edges of the blocks 10 is to form a cross-channel perpendicular to the parallel channels formed by the V or U-shaped grooves between bevels 20, for draining off the product aluminium to maintain canals 40' of aluminium in the V or U-shaped grooves at a constant level. Such cross-channels can be formed in one or both ends of the blocks and, if required, one or more intermediate cross channels can be formed by machining grooves across the blocks 10, intersecting with the V or U-shaped grooves formed by bevels 20.

These cross-channels are connected to a reservoir of molten aluminium, possibly with a weir in order to set the level of the aluminium canals 40'. Operation is possible with a fluctuating level of the aluminium canals 40' or with a steady level.

The present invention has been described with respect to preferred embodiments. Modifications and alterations will occur to others upon the reading and understanding of the specification. It is intended that all such modifications and alterations be included insofar as they come within the scope of the invention as claimed and equivalents thereof.

I claim:

1. A cathode block of a drained-cathode electrolytic cell for the electrowinning of aluminium from alumina dissolved in a fluoride-based molten electrolyte, having a sloped top surface, side surfaces and a bottom surface, so that when several blocks are laterally placed side-by-side their top surfaces form a series of juxtaposed V-shaped surfaces, each sloped surface forming a drained cathode surface down which a layer of produced molten aluminium is continuously drained when the cathode block is in use to electrowin aluminium, the cathode block further comprising a cut-out along the lower edge of the sloped top surface, so that when two cathode blocks are placed side-by-side to form a V-shaped top surface a recessed groove is formed between them by juxtaposition of the cut-outs of the two side-by-side blocks, said recessed groove being located along and below the bottom of the V-shaped surfaces, and serving to collect and evacuate the molten aluminium drained from the bottom of the sloped V-shaped cathode surfaces, during cell operation.

2. The carbon cathode block of claim 1, wherein the bottom surface of the cathode block has a groove or like recess extending therealong generally parallel to the top surface and to one side surface of the cathode block, for receiving a steel or other conductive bar for the delivery of current.

3. The carbon cathode block of claim 2, comprising a steel or other conductive bar secured in the grrove or like recess.

4. The carbon cathode block of claim 1, wherein said cut-out is so shaped that the recessed grooves formed between side-by-side blocks have a rectangular cross-section.

5. The carbon cathode block of claim 1, wherein said cut-out is so shaped that the recessed grooves formed between side-by-side blocks have a trapezoidal cross-section.

6. The cathode block of claim 1, wherein said cut-out is so shaped that the recessed grooves formed between side-by-side blocks have a U-shaped cross-section.

7. The cathode block of claim 1, wherein said cut-out is so shaped that the recessed grooves formed between side-by-side blocks have a V-shaped cross-section.

8. The cathode block of claim 1, wherein said cut-out is so shaped that the recessed grooves formed between side-by-side blocks have a curved or rounded cross-section.

9. The cathode block of claim 1, wherein said cut-out is so shaped that the recessed grooves formed between side-by-side blocks have an asymmetric cross-section.

10. The cathode block of claim 1 whose top surface comprises at least one cross channel which intersects with said cut-out.

11. The cathode block of claim 1 whose top surface is coated with aluminium-wettable refractory material.

12. A cell for the electrowinning of aluminium by the electrolysis of alumina dissolved in a fluoride-based molten electrolyte comprising several cathode blocks as defined in claim 1, the cathode blocks being laterally placed side-by-side so that their top surfaces form a series of juxtaposed V-shaped drained top surfaces, and so that their cut-outs form a series of recessed grooves, each groove being located along and below the bottom of each V-shaped drained top surface, each groove during cell operation collecting and evacuating the molten aluminium drained from the bottom of the sloped V-shaped cathode surface.

13. A method of electrowinning aluminium in a cell as defined in claim 12, comprising electrolysing dissolved alumina on the V-shaped drained top surfaces of the cathode blocks to produce aluminium, and continuously draining the produced aluminium from the bottom of the V-shaped drained top surfaces into the recessed grooves for collection and evacuation thereof.

* * * * *